United States Patent
Heyn et al.

(10) Patent No.: US 6,581,734 B2
(45) Date of Patent: Jun. 24, 2003

(54) DAMPING VALVE FOR A SHOCK ABSORBER

(75) Inventors: Steffen Heyn, Schweinfurt (DE); Andreas Sieber, Schweinfurt (DE); Robert Moller, Aidhausen (DE); Alfred Memmel, Schonungen (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/152,057

(22) Filed: May 21, 2002

(65) Prior Publication Data
US 2002/0175033 A1 Nov. 28, 2002

(30) Foreign Application Priority Data
May 21, 2001 (DE) .......................... 101 24 582

(51) Int. Cl.$^7$ .................................. F16F 9/34
(52) U.S. Cl. ........................ 188/322.15; 188/282.6
(58) Field of Search .................. 188/282.1–282.9, 188/322.15, 322.22

(56) References Cited

U.S. PATENT DOCUMENTS

| 4,624,347 A | * | 11/1986 | Mourray ............... 188/322.15 |
| 5,937,976 A | * | 8/1999 | Grundei ............... 188/322.15 |
| 6,129,005 A | | 10/2000 | Asadi et al. ............... 92/183 |
| 6,371,264 B1 | * | 4/2002 | Deferme ............... 188/322.15 |
| 2001/0023801 A1 | | 9/2001 | Fenn et al. ............ 188/322.15 |

FOREIGN PATENT DOCUMENTS

| DE | 18 17 392 | 9/1775 | ............ F16F/9/348 |
| DE | 37 20 584 | 12/1993 | ............ F16F/9/52 |
| DE | 44 10 996 | 6/1995 | ............ F16F/9/32 |
| DE | 100 28 114 | 12/2000 | ............ F16F/9/34 |

* cited by examiner

Primary Examiner—Christopher P. Schwartz

(57) ABSTRACT

Damping valve comprising a damping valve body with at least one flow-through channel, the outlet of which is covered at least by an elastic valve disk, which is pretensioned against the damping valve body at least indirectly by a spring, where at least one support disk of smaller diameter is provided on the elastic valve disk, facing the spring, this support disk not executing any elastic movement, the spring exerting its force in the area radially outside the support disk.

8 Claims, 4 Drawing Sheets

DAMPING VALVE FOR A SHOCK ABSORBER

BACKGROUND OF THE INVENTION

1. Field of the Invention

The invention pertains to a damping valve for a shock absorber including a valve body with at least one flow-through channel with an outlet covered by an elastic valve disk which is pretensioned, against the body by a spring.

2. Description of the Related Art

DE 44 10 996, to which U.S. Pat. No. 5,615,756 corresponds, describes a flat piston for a shock absorber. This flat piston can be equipped with various valve disks and spring sets, so that a certain damping force characteristic can be obtained.

Thus, in variant V2 of FIG. 1, a valve disk which is clamped rigidly in place around its inside diameter is used. It is also possible to use additional valve disks, the outside diameters of which become smaller with increasing axial distance. The overall valve disk assembly is pretensioned by a cup spring.

A valve assembly of this type represents a compromise between the fatigue strength of the valve disks and the desired damping force characteristic. In many cases, the goal is to obtain a weak damping force when the flow velocities in the damping valve are low; this is accomplished with a "soft" valve disk. At very high flow velocities, however, a very soft valve disk would either break or undergo plastic deformation. The fatigue behavior is also strongly dependent on the material.

It is also obvious that it would be possible to choose a valve disk made of thicker material, but in this case, it is no longer possible in some cases to obtain the desired low damping forces at low flow velocities.

SUMMARY OF THE INVENTION

The object of the present invention is to create a damping valve which, first, provides a low damping force at low flow velocities and, second, has high fatigue strength even at high flow velocities.

The task is accomplished by providing at least one support disk of smaller diameter, which does not execute any elastic movement, on the elastic valve disk, facing the spring, the spring acting radially outside the support disk.

With respect to the valve disk, the minimum of one support disk has the effect of reducing the internal stresses in the valve disk caused by the deformations under the flow arriving from the flow-through channel to a level significantly below that known in the state of the art. This means that a valve disk with a greater degree of overall elasticity can be used, so that weaker damping forces can be realized.

Depending on the desired damping valve characteristic and the amount of radial space available, it is also possible to use several support disks, the diameters of which increase with increasing distance from the valve disk. The support disks can be very thin, because they are not required to execute any elastic motion. The valve disk rests against the outer edges of the support disks. The stress level reached in the valve disk can be controlled very accurately by the way in which the individual support disks are stacked with respect to their diameters and thicknesses.

Especially when only a very few support disks are used, it is appropriate for the largest support disk to be rigid. Otherwise, it is possible under certain circumstances for the very thin support disks to undergo elastic deformation as well during the elastic deformation of the valve disk.

Alternatively or in combination, it is also possible to use a rigid support disk which has a convex surface facing the valve disk. This possibility is especially attractive when the large numbers of parts are to be manufactured.

With respect to the construction space available, the spring is designed as a cup spring.

So that a wider range of variation is possible with respect to the coordination and selection of the springs, at least one compensating disk is provided on the valve disk, in the radially outside area, concentrically to the minimum of one support disk. The spring is supported on this compensating disk. It is possible with one and the same spring, for example, to pretension the valve disk to different degrees by varying the thickness of the compensating disk or possibly several compensating disks.

The compensating disk can be guided reliably by centering it on the minimum of one support disk. Alternatively, the compensating disk can position itself radially by a centering surface of the piston. The advantage of this variant is that the outside diameter of the support disk can be selected independently of the inside diameter of the compensating disk and thus the optimal support points for the valve disk can be obtained.

So that no additional stress peaks in the valve disk are produced, the diameters of the compensating disk are selected in such a way that it is aligned with the valve contact surface for the valve disk, at least in the axial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
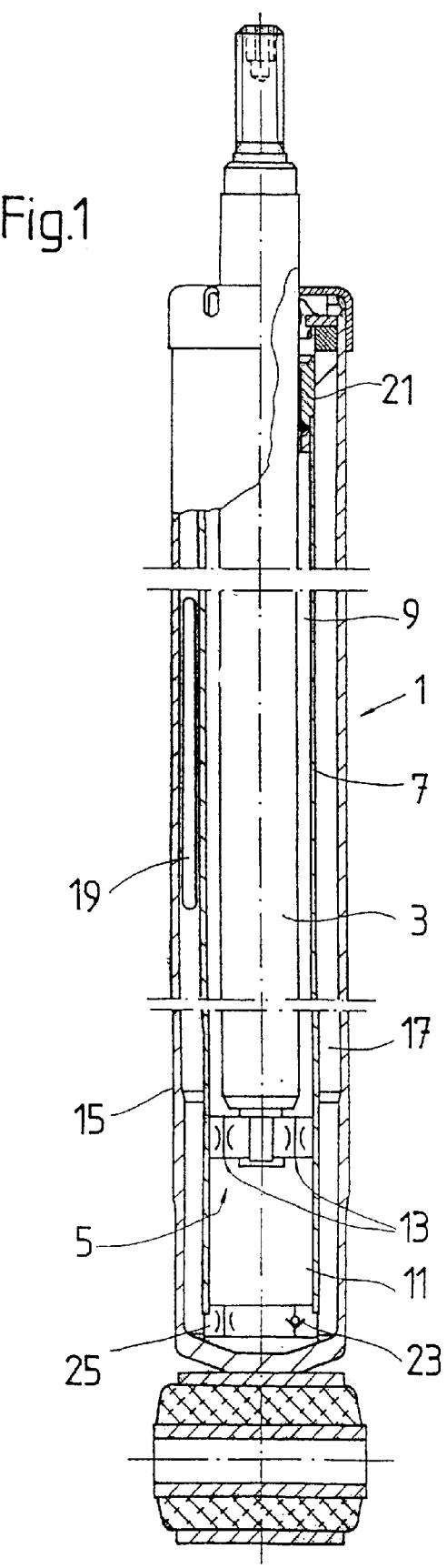
FIG. 1 shows a shock absorber as a complete assembly.

FIG. 1 shows a shock absorber 1 of the double-tube type, known in and of itself, in which a piston rod 3 with a piston 5 is guided with freedom of axial movement in a pressure tube 7. The piston 5 separates the pressure tube into an upper working space 9 and a lower working space 11, these two working spaces being connected to each other by damping valves 13 in the piston.

The pressure tube 7 is surrounded by a jacket tube 15. The inside walls of the jacket tube and the outside walls of the pressure tube form a compensating space 17, which is completely filled with damping medium and an enclosed gas mass 19 extending all the way to a piston rod guide 21. At the lower end of the working space 11, a bottom part is provided, which, if desired, can have a nonreturn valve 23 and a damping valve 25.

Figure 2:
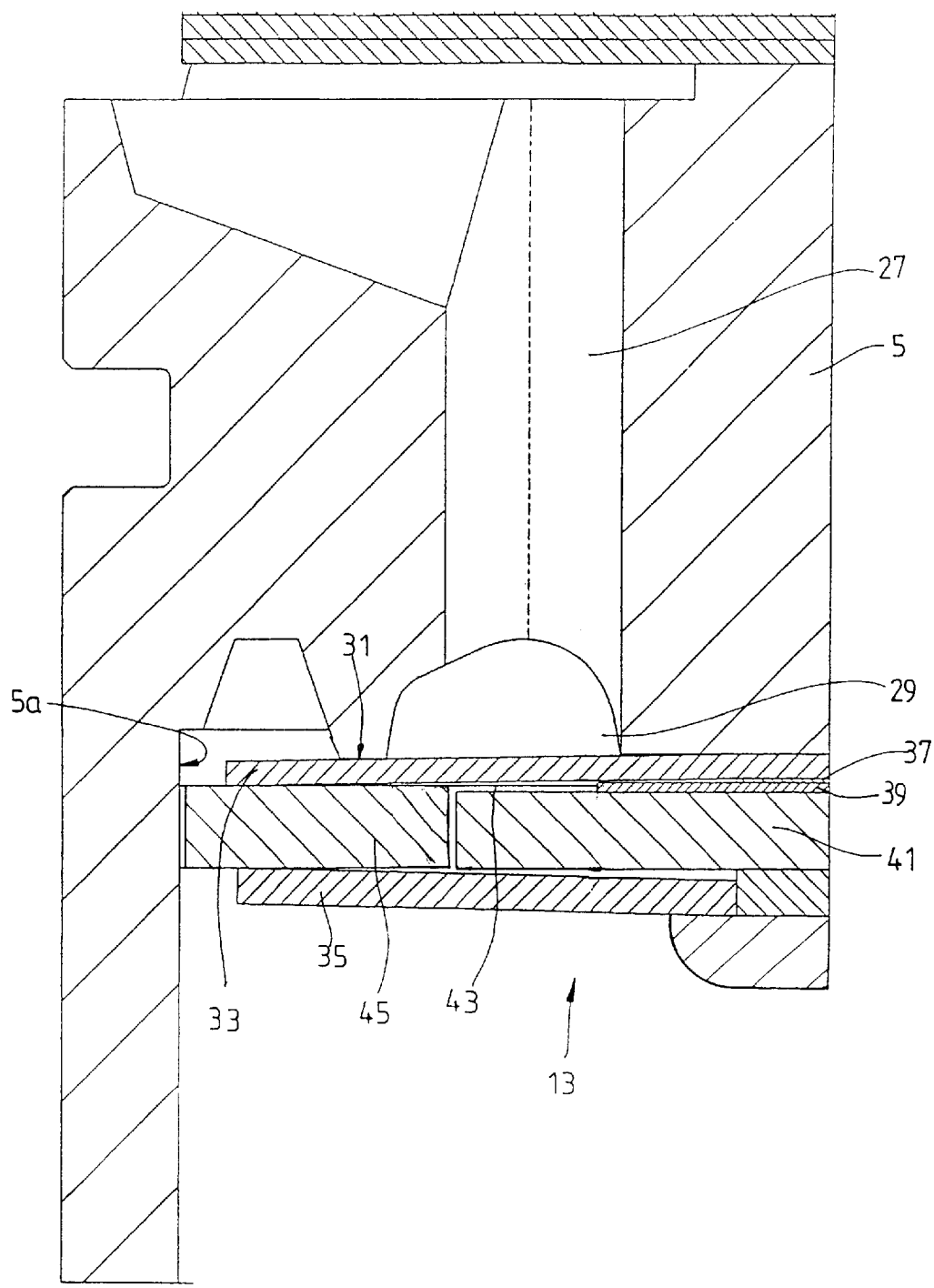
FIG. 2 is a partial cross-section of a damping valve according to the invention with thin support disks.

FIG. 2 shows a detailed view of the piston 5, which represents the damping valve body of the damping valve 13. Within the damping valve body, there is at least one flow-through channel 27, which connects the two working spaces 9; 11 to each other. The invention can also be applied equally well to the damping valve 25. At an outlet 29 of the flow-through channel, an elastic valve disk 33 rests on a valve contact surface 31; the disk at least partially covers the outlet. At least one support disk 37; 39; 41 is provided on the valve disk 33, facing a spring 35, e.g., a cup spring in the present exemplary embodiment. The support disks 37; 39 are very thin and are stacked according to their diameters in such a way that the support disk with the smallest diameter rests against the valve disk 33, whereas the largest support disk 41 is the farthest away. Although the support disks 37; 39 can be elastic as individual parts, in association with the rigid support disk 41 they form an inelastic package. Thus an open space 43 is created between the valve disk 33 and the support disks.

The valve disk 33, the support disks 37; 39; 41 and the centering disk for the spring 35 are connected tightly at their inside diameters to the damping valve body. The spring 35 thus acts on the radially outside area of the valve disk, which is pretensioned onto the damping valve body, i.e., onto the piston.

At least one compensating disk 45 is provided in the radially outside area, concentric to the support disks. The compensating disk is centered by its inside diameter on the largest support disk 41. The compensating disk can also be centered by a centering surface 5a, which in this case is the skirt of the piston 5. It is thus possible for a relatively wide gap to be present between the outside diameters of the support disks and the inside diameter of the compensating disk 45. The outside diameters of the support disks can therefore be coordinated effectively to obtain a support circle of the desired diameter. With respect to the valve contact surface 31, the diameters of the support disks and of the compensating disk 45 are coordinated with each other in such a way that the compensating disk is aligned in the axial direction with the valve contact surface 37.

The thickness of the compensating disk 45 can vary; it is determined on the basis of the desired damping force characteristic, the existing spring, the dimensions of the damping valve body, and the thickness of the support disk package.

When, as a result of a motion of the piston rod toward the working space 11, the damping medium enters the flow-through channel and strikes the valve disk 33 in the area of the outlet 29, the pressure acting on the valve disk 33 causes the outer radial part of the valve disk to rise elastically from its seat 31. As soon as a defined amount of lift has occurred, the valve disk makes contact with the outer edge of the support disk 37. A circular ring-shaped area of the valve disk 33, which begins at the inside diameter and extends to the outer edge of the support disk 37, is deformed only marginally even under significant load, which has the effect of reducing the stresses in the disk 33 in the area where it is clamped. If the compressive force continues to increase on the surface of the valve disk 33 in the area of the outlet 29, the valve disk 33 comes into contact with the support disk 39. Thus the area of the valve disk 33 extending from the inside diameter to the outer edge of the support disk 39 now also participates to only a very limited extent in any further elastic deformation. The same effect occurs when the load increases yet again and contact is made with the outside diameter of the support disk 41. At this point there is no longer any open space 43, and only the edge area of the valve disk 33 extending beyond it is still capable of deformation.

The number of support disks can be increased. The decision is made according to the requirements of the damping force characteristic and the stress peaks which occur in the valve disk 33.

Figure 3:
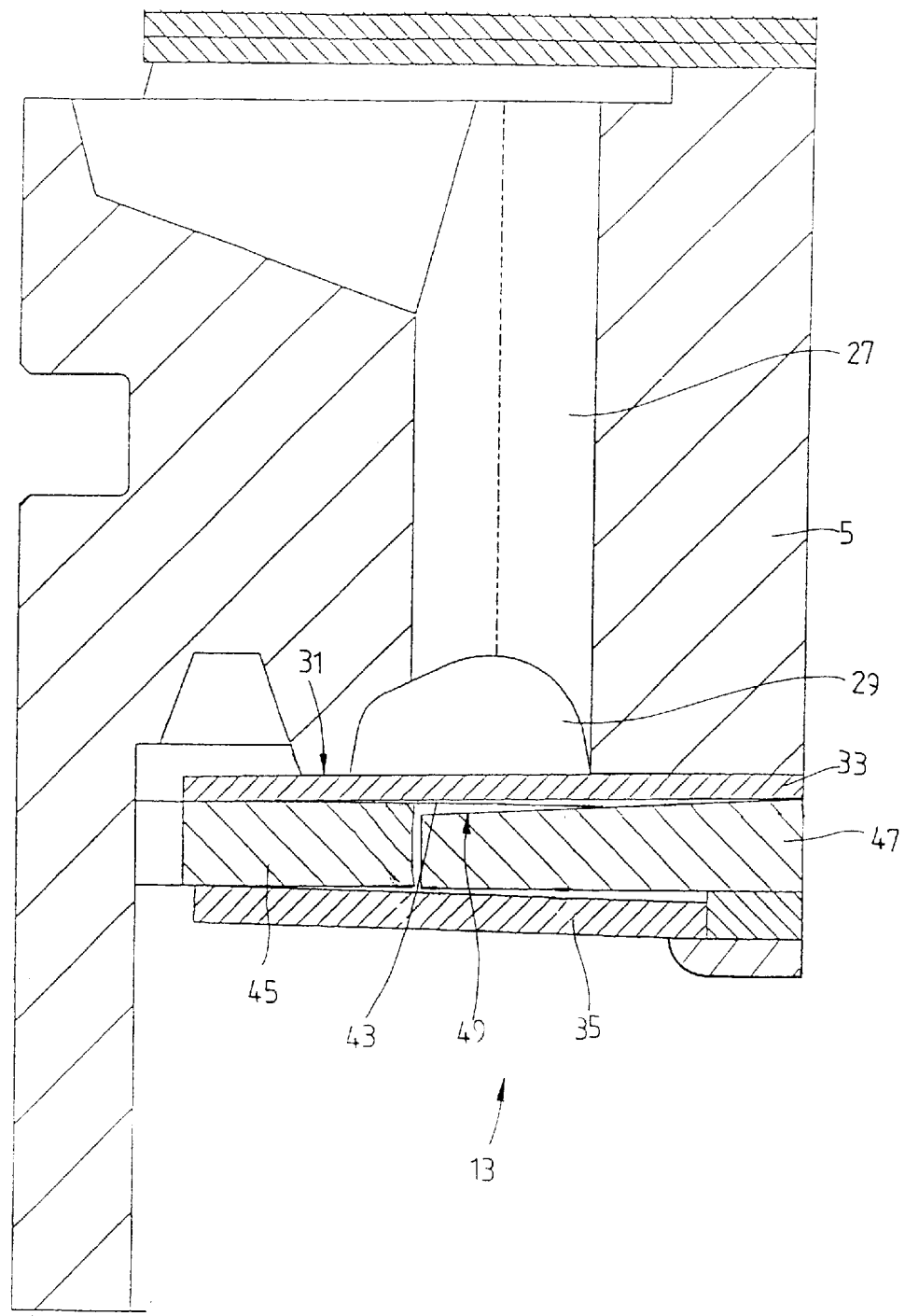
FIG. 3 is a partial cross-section of a valve disk with a convexly formed thick support disk.

If the number of units to be manufactured allows, it can be advisable, as FIG. 3 shows, to use a support disk 47 with a convex surface 49 facing the valve disk 33 instead of a group of support disks. The valve disk 33 can roll down the surface 49, on which it is optimally supported.

Figure 4:
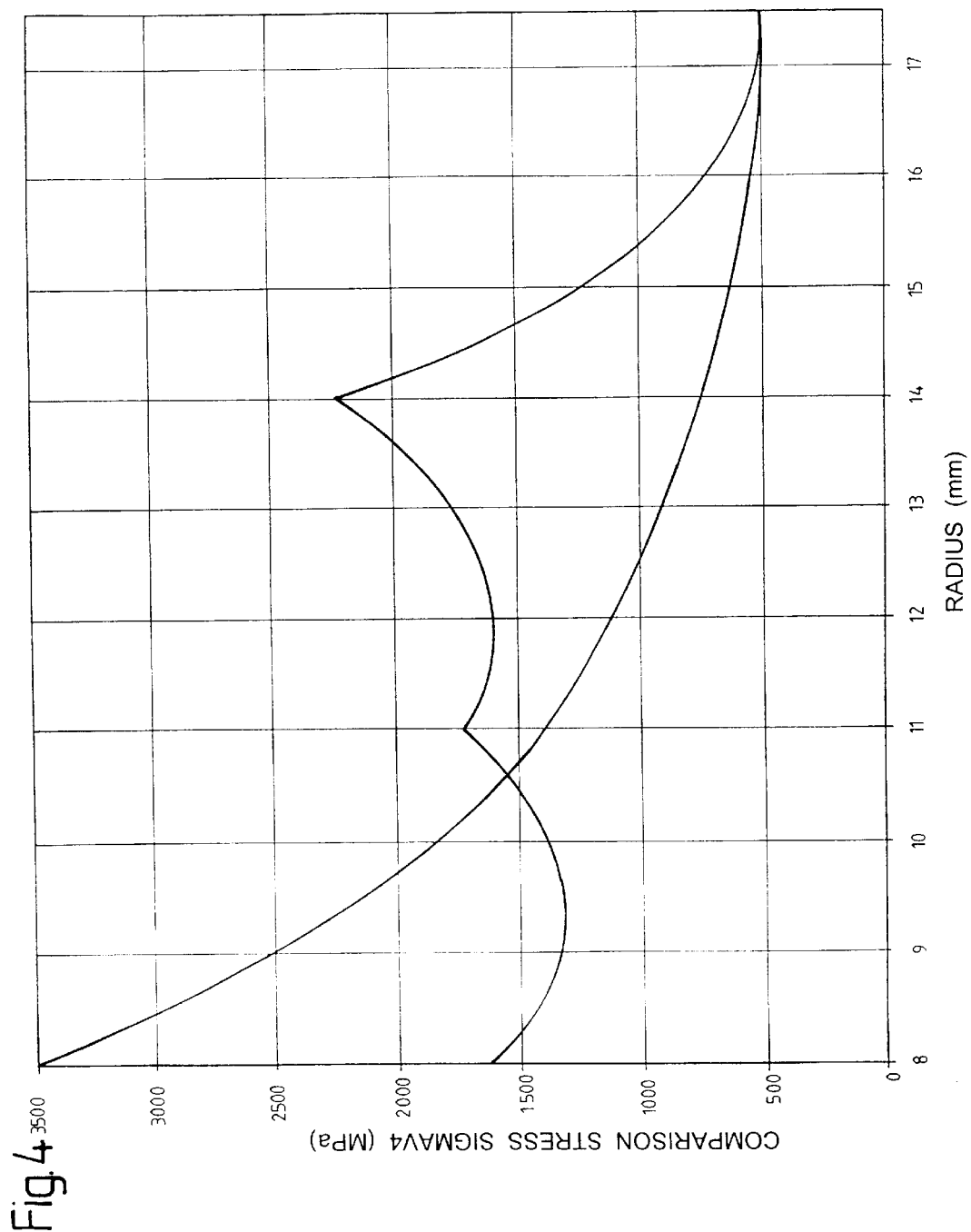
FIG. 4 shows a characteristic curve of valve disk stress.

FIG. 4 is intended to illustrate the positive effect of the support disks. The characteristic curve describes the change in the stress state in the valve disk 33. Starting from the inner edge of the valve disk, the stress increases up as far as the contact point with the first support disk 37. Then the stress falls again and reaches a second stress peak at the point where contact is made with the second support disk 39. Let us consider the curve more closely. If we omit the second support disk 39 and extend the stress characteristic in the same way as it appears at the first stress peak, we can see that a much higher level of stress would be reached in this radial area of the valve disk. The reduction in stress achieved makes it possible to use thinner valve disks.

For comparison, FIG. 4 shows the characteristic hyperbolic form of the stress curve of an identical valve disk without support disks. The reduction in stress which has been achieved can be clearly seen. The highest stress peak, not the average stress, is always the most important factor with respect to fatigue strength.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A damping valve for a shock absorber comprises a damping valve body having at least one flow-through channel having an outlet, an elastic valve disk having a diameter and covering said outlet, a spring which pretensions said valve disk axially against said damping valve body, at least one compensating disk provided on said valve disk and supporting said spring, at least one support disk provided on said elastic valve disk and facing said spring, said at least one support disk being concentric to and radially inside of said compensating disk and having a diameter which is smaller than the diameter of said valve disk, said spring acting on said at least one compensating disk radially outside of said at least one support disk.

2. A damping valve as in claim 1 wherein said at least one support disk comprises a plurality of said support disks, said support disks having diameters which increase with increasing axial distance from said valve disk.

3. A damping valve as in claim 2 wherein the support disk furthest from said valve disk is rigid.

4. A damping valve as in claim 1 wherein said at least one support disk consists of a support disk having a convex surface facing said valve disk.

5. A damping valve as in claim 1 wherein said spring is a cup spring.

6. A damping valve as in claim 1 wherein said at least one compensating disk is centered on said at least one support disk.

7. A damping valve as in claim 1 wherein said valve body has a radially inward facing centering surface, said at least one compensating disk being positioned radially by said centering surface.

8. A damping valve as in claim 1 wherein said valve body has a valve contact surface against which said elastic valve disk is pretensioned, said at least one compensating disk being axially aligned with said valve contact surface.

* * * * *